US006666185B1

(12) United States Patent
Willi et al.

(10) Patent No.: US 6,666,185 B1
(45) Date of Patent: Dec. 23, 2003

(54) DISTRIBUTED IGNITION METHOD AND APPARATUS FOR A COMBUSTION ENGINE

(75) Inventors: Martin L. Willi, Dunlap, IL (US);
Scott B. Fiveland, Peoria, IL (US);
Joel D. Hiltner, Powell, OH (US);
Weidong Gong, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/255,869

(22) Filed: Sep. 26, 2002

Related U.S. Application Data

(60) Provisional application No. 60/384,311, filed on May 30, 2002.

(51) Int. Cl.⁷ .................................................. F02B 3/00
(52) U.S. Cl. ......................... 123/299; 123/300; 123/304
(58) Field of Search ................. 123/299, 300, 123/304, 526, 295, 520

(56) References Cited

U.S. PATENT DOCUMENTS

| 5,870,978 A | | 2/1999 | Willi et al. | |
|---|---|---|---|---|
| 6,032,617 A | | 3/2000 | Willi et al. | |
| 6,095,102 A | | 8/2000 | Willi et al. | |
| 6,202,601 B1 | * | 3/2001 | Ouellette et al. | ....... 123/27 GE |
| 6,286,482 B1 | * | 9/2001 | Flynn et al. | ................. 123/435 |
| 6,463,907 B1 | * | 10/2002 | Hiltner | ........................ 123/304 |
| 6,467,495 B2 | * | 10/2002 | Shost | ...................... 137/15.18 |
| 6,484,689 B1 | * | 11/2002 | Hasegawa | .................... 123/299 |
| 6,516,782 B1 | * | 2/2003 | Thomas | ...................... 123/436 |
| 2003/0101963 A1 | | 6/2003 | Esteghlal et al. | |

FOREIGN PATENT DOCUMENTS

| EP | 02/18768 A1 | * | 3/2002 |
|---|---|---|---|
| WO | WO 01/86128 A2 | | 5/2001 |

OTHER PUBLICATIONS

For Operation (Caterpillar File 97–717).
ASME–ICE Paper Strategies for Reduced Nox Emissions in Pilot–Ignited Natural Gas Engines.

* cited by examiner

*Primary Examiner*—John Kwon
(74) *Attorney, Agent, or Firm*—Steven D Lundquist

(57) ABSTRACT

A method and apparatus for injecting pilot fuel in a combustion engine. The method and apparatus includes determining a load of the engine, determining a desired injection timing of the pilot fuel and a desired quantity of pilot fuel to be injected as a function of a desired homogeneous distribution of the pilot fuel based on the engine load, and adjusting the injection timing and quantity of the pilot fuel to the desired values.

26 Claims, 3 Drawing Sheets

DISTRIBUTED IGNITION METHOD AND APPARATUS FOR A COMBUSTION ENGINE

This application claims the benefit of prior provisional patent application Ser. No. 60/384311 filed May 30, 2002.

Technical Field

This invention relates generally to a method and apparatus for providing distributed ignition of a combustion engine and, more particularly, to a method and apparatus for controlling the timing and amount of a pilot fuel injected into a combustion engine for distributed ignition.

BACKGROUND

Low cetane, i.e., high octane, fuels, such as natural gas, have several advantages over other hydrocarbon fuels that are combusted in internal combustion engines. For example, natural gas is less expensive relative to other hydrocarbon fuels. Moreover, natural gas burns cleaner during operation of the internal combustion engine relative to other hydrocarbon fuels. By burning cleaner, a reduced amount of combustion byproducts such as carbon monoxide, oxides of nitrogen, and hydrocarbons are released into the environment during engine operation. In addition, because lubricants of the internal combustion engine become contaminated with combustion byproducts over time, the production of a reduced amount of combustion byproducts results in less contamination, thereby increasing the useful life of the lubricants.

One type of internal combustion engine is a diesel engine. Diesel engines combust fuel by compressing a mixture of air and fuel to a point where the fuel is ignited by heat which results from such compression. When natural gas is used as a fuel in a diesel engine, the natural gas does not readily ignite as it is compressed. In order to overcome this problem, an ignition source is provided to ignite the natural gas. The ignition source may be provided by a spark plug similar to those used in spark ignition engines. However, in certain types of diesel engines, e.g., dual fuel engines, the ignition source is provided by injecting a small amount of pilot fuel, such as diesel fuel, into a mixture of air and natural gas (or other gaseous fuel). As the mixture of air, natural gas and pilot fuel is compressed, the pilot fuel ignites, which in turn provides a diesel type ignition of the natural gas.

A disadvantage associated with using pilot fuel as an ignition source is the resulting generation of an increased amount of oxides of nitrogen ($NO_x$). In particular, the ratio of air to the combination of natural gas and pilot fuel in the combustion chamber varies with the proximity to the injected streams of pilot fuel. Rich mixtures are created near the location of injection of pilot fuel, while lean mixtures are created further away from the location of the injection. Combustion of the rich mixtures tend to produce more $NO_x$ than does the combustion of the lean mixtures.

One way to reduce the amount of $NO_x$ produced during the combustion process is to create a lean homogeneous mixture of air, natural gas and pilot fuel throughout the combustion chamber prior to ignition of the pilot fuel. Because the homogeneous mixture is lean throughout the entire combustion chamber, only lean mixtures are combusted. Combustion of only lean mixtures produces a lesser quantity of $NO_x$ than does combustion of a combination of rich mixtures and lean mixtures.

In commonly-owned U.S. Pat. No. 6,095,102, Willi et al. (Willi) discloses a method for injecting a quantity of pilot fuel into a combustion chamber having a supply of gas/air mixture. The pilot fuel is injected during the compression stroke in the range from about 21 degrees to 28 degrees before top dead center (BTDC) and is used to provide distributed ignition of the gas/air mixture. Willi discloses that injection of the pilot fuel in advance of what has been typically done in the industry, e.g., from 5 to 20 degrees BTDC, provides for a homogeneous mixture of the pilot fuel with the main portion of the gas and air. Furthermore, Willi discloses that the exact desired timing of the injection is determined by sensing the amount of $NO_x$ in the exhaust stream during each subsequent exhaust stroke and varying the timing until an optimal level of $NO_x$ is attained.

It has been found that, since Willi's initial disclosed method, variations in engines and engine operating conditions result in situations in which the optimal desired timing of the pilot fuel injection resides outside of the 21 to 28 degree BTDC range during the compression stroke. Furthermore, sensing the level of $NO_x$ and responsively varying the pilot injection timing does not always yield the best results. For example, optimal results may be achieved by varying the timing of the pilot fuel injection as well as the amount of pilot fuel injected. This can only be accomplished by determining parameters other than merely sensing $NO_x$, and responsively controlling both the timing and the amount of the pilot fuel injection.

The present invention is directed to overcoming one or more of the problems as set forth above.

SUMMARY OF THE INVENTION

In one aspect of the present invention a method for injecting pilot fuel in a combustion engine is disclosed. The method includes the steps of determining a load of the engine, determining a desired injection timing of the pilot fuel and a desired quantity of pilot fuel to be injected as a function of a desired homogeneous distribution of the pilot fuel based on the engine load, and adjusting the injection timing and quantity of the pilot fuel to the desired values.

In another aspect of the present invention a method for providing distributed ignition of a combustion engine is disclosed. The method includes the steps of introducing a quantity of fuel/air mixture into a combustion chamber of the engine, determining an operating load of the engine, determining a desired injection timing of a pilot fuel and a desired quantity of the pilot fuel to be injected as a function of a desired homogeneous distribution of the pilot fuel with the fuel/air mixture based on the engine load, and injecting the pilot fuel at the desired time.

In yet another aspect of the present invention an apparatus for providing distributed ignition of a combustion engine is disclosed. The apparatus includes a cylinder assembly which includes (1) an engine block having a piston cylinder defined therein, (2) an engine head secured to the engine block, and (3) a piston which translates within the piston cylinder, wherein the engine block, the engine head, and the piston cooperate to define a combustion chamber. The apparatus further includes an intake port positioned in fluid communication with the combustion chamber during intake of a primary fuel and air mixture, a fuel injector positioned in the engine head and operable to inject pilot fuel into the combustion chamber during a compression stroke of the engine, an engine load determining device, and a controller which receives information from the engine load determining device and responsively determines a desired injection timing of the pilot fuel and a desired quantity of pilot fuel to be injected based on a desired homogeneous distribution of the pilot fuel.

DETAILED DESCRIPTION

Figure 1:
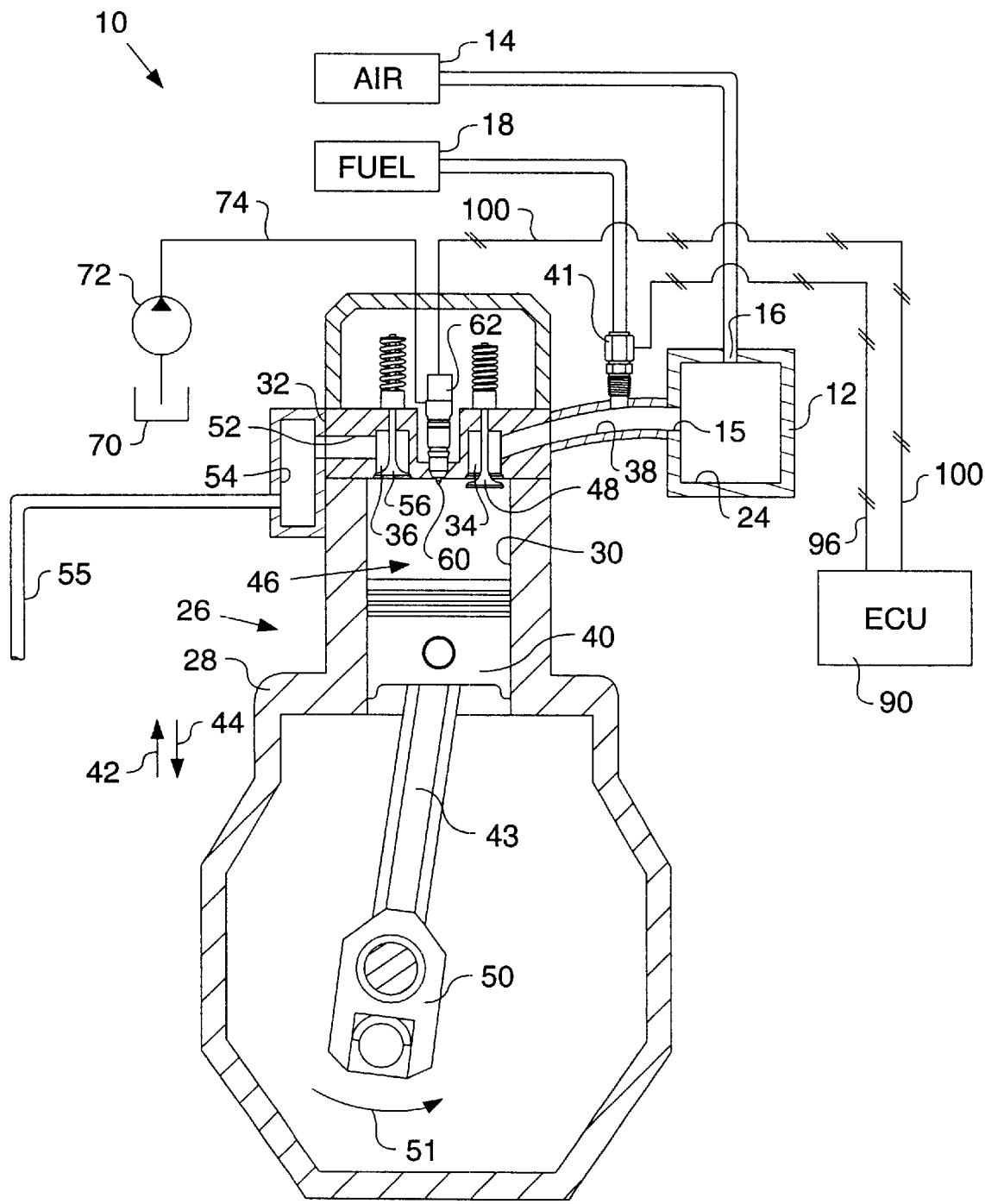
FIG. 1 is a partial cross sectional, partial schematic view of a combustion engine which incorporates the features of the present invention.

Referring to FIG. 1, there is shown an engine assembly 10. The engine assembly 10 includes a plenum member 12, and an air source 14. The plenum member 12 has an inlet opening 16, and an exit opening 15 defined therein. The air source 14 supplies air to the inlet opening 16. Air from the air source 14 advances into a plenum chamber 24 defined in the plenum member 12 via the inlet opening 16.

The engine assembly 10 further includes a cylinder assembly 26. The cylinder assembly 26 includes a block 28 having a piston cylinder 30 defined therein. An engine head 32 is secured to the block 28. The engine head 32 has an intake port 34, an exhaust port 36, and a fuel injector opening 60 defined therein. An intake conduit 38 places the intake port 34 in fluid communication with the exit opening 15 of the plenum member 12. An exhaust passage 52 places the exhaust port 36 in fluid communication with an exhaust manifold 54.

The engine assembly 10 further includes a piston 40 which translates in the piston cylinder 30 in the general direction of arrows 42 and 44. As the piston 40 moves downwardly in the general direction of arrow 44 to the position shown in FIG. 1, a connecting rod 43 urges a crankshaft 50 to rotate in the general direction of arrow 51. Subsequently, as the crankshaft 50 continues to rotate in the general direction of arrow 51, the crankshaft 50 urges the connecting rod 43 and the piston 40 in the general direction of arrow 42 to return the piston 40 to the uppermost position (not shown).

The piston 40, the piston cylinder 30, and the engine head 32 cooperate so as to define a combustion chamber 46. In particular, when the piston 40 is advanced in the general direction of arrow 42, the volume of the combustion chamber 46 is decreased. On the other hand, when the piston 40 is advanced in the general direction of arrow 44, the volume of the combustion chamber 46 is increased as shown in FIG. 1.

The engine assembly 10 further includes a primary fuel source 18 in fluid communication with the intake conduit 38. A primary fuel supply valve 41 controls the amount of primary fuel, such as natural gas, advanced to the intake conduit 38. In particular, the primary fuel supply valve 41 moves between an open position, which advances primary fuel to the intake conduit 38, and a closed position, which prevents advancement of primary fuel to the intake conduit 38. It should be appreciated that the amount of primary fuel advanced by the primary fuel valve 41 controls the ratio of air to primary fuel, or air/fuel ratio, advanced to the combustion chamber 46. Specifically, if it is desired to advance a leaner mixture to the combustion chamber 46, a primary fuel control signal received via a signal line 96 causes the primary fuel supply valve 41 to operate so as to advance less primary fuel to the intake conduit 38. On the other hand, if it is desired to advance a richer mixture of air and primary fuel to the combustion chamber 46, a primary fuel control signal received via the signal line 96 causes the primary fuel supply valve 41 to operate so as to advance more primary fuel to the intake conduit 38.

It is noted that other methods of introducing the primary fuel and air mixture to the combustion chamber 46 may be used without deviating from the spirit and scope of the present invention. For example, the primary fuel may be mixed with air at any point from the air source 14 through the intake conduit 38, including upstream of a turbocharger (not shown). Alternatively, the primary fuel may be injected directly into the combustion chamber 46, and subsequently mixed with the intake of air.

The primary fuel is typically a fuel having a high octane number, i.e., low cetane number. Preferably, the primary fuel is natural gas. However, the primary fuel may be of some other type, such as gasoline, methanol, ethanol, and the like, and may be either gaseous or liquid.

An intake valve 48 selectively places the plenum chamber 24 in fluid communication with the combustion chamber 46. The intake valve 48 is actuated in a known manner by a camshaft (not shown), a pushrod (not shown), and a rocker arm (not shown) driven by rotation of the crankshaft 50. When the intake valve 48 is placed in the open position (shown in FIG. 1), air and primary fuel are advanced from the intake conduit 38 to the combustion chamber 46 via the intake port 34. When the intake valve 48 is placed in the closed position (not shown), primary fuel and air are prevented from advancing from the intake conduit 38 to the combustion chamber 46 since the intake valve 48 blocks fluid flow through the intake port 34.

An exhaust valve 56 selectively places the exhaust manifold 54 in fluid communication with the combustion chamber 46. The exhaust valve 56 is actuated in a known manner by a camshaft (not shown), a pushrod (not shown), and a rocker arm (not shown) each of which are driven by the rotation of the crankshaft 50. When the exhaust valve 56 is placed in the open position (not shown), exhaust gases are advanced from the combustion chamber 46 to the exhaust manifold 54 via a fluid path that includes the exhaust port 36 and the exhaust passage 52. From the exhaust manifold 54, exhaust gases are advanced to an exhaust conduit 55. When the exhaust valve 56 is placed in the closed position (shown in FIG. 1), exhaust gases are prevented from advancing from the combustion chamber 46 to the exhaust manifold 54 since the exhaust valve 56 blocks fluid flow through the exhaust port 36.

Combustion of the mixture of primary fuel and air in the combustion chamber 46 produces a number of exhaust gases. After the mixture of primary fuel and air is combusted in the combustion chamber 46, exhaust gases are advanced through the exhaust conduit 55. Included among the exhaust gases are quantities of oxides of nitrogen ($NO_x$).

The engine assembly 10 further includes a fuel reservoir 70. A fuel pump 72 draws low pressure fuel from the fuel reservoir 70 and advances high pressure fuel to a fuel injector 62 via a fuel line 74. The fuel injector 62 is positioned in the injector opening 60 and is operable to inject a quantity of fuel into the combustion chamber 46 through the injector opening 60. In particular, the fuel injector 62 injects fuel into the combustion chamber 46 upon receipt of an injector control signal on a signal line 100. Furthermore, the fuel can be any one of the following group of fuels: diesel fuel, crude oil, lubricating oil, or an emulsion of water and diesel fuel. More generally, the fuel may be any type of fuel which has a higher cetane number than the primary fuel, thus having the property of combusting more readily than the primary fuel.

Figure 2:
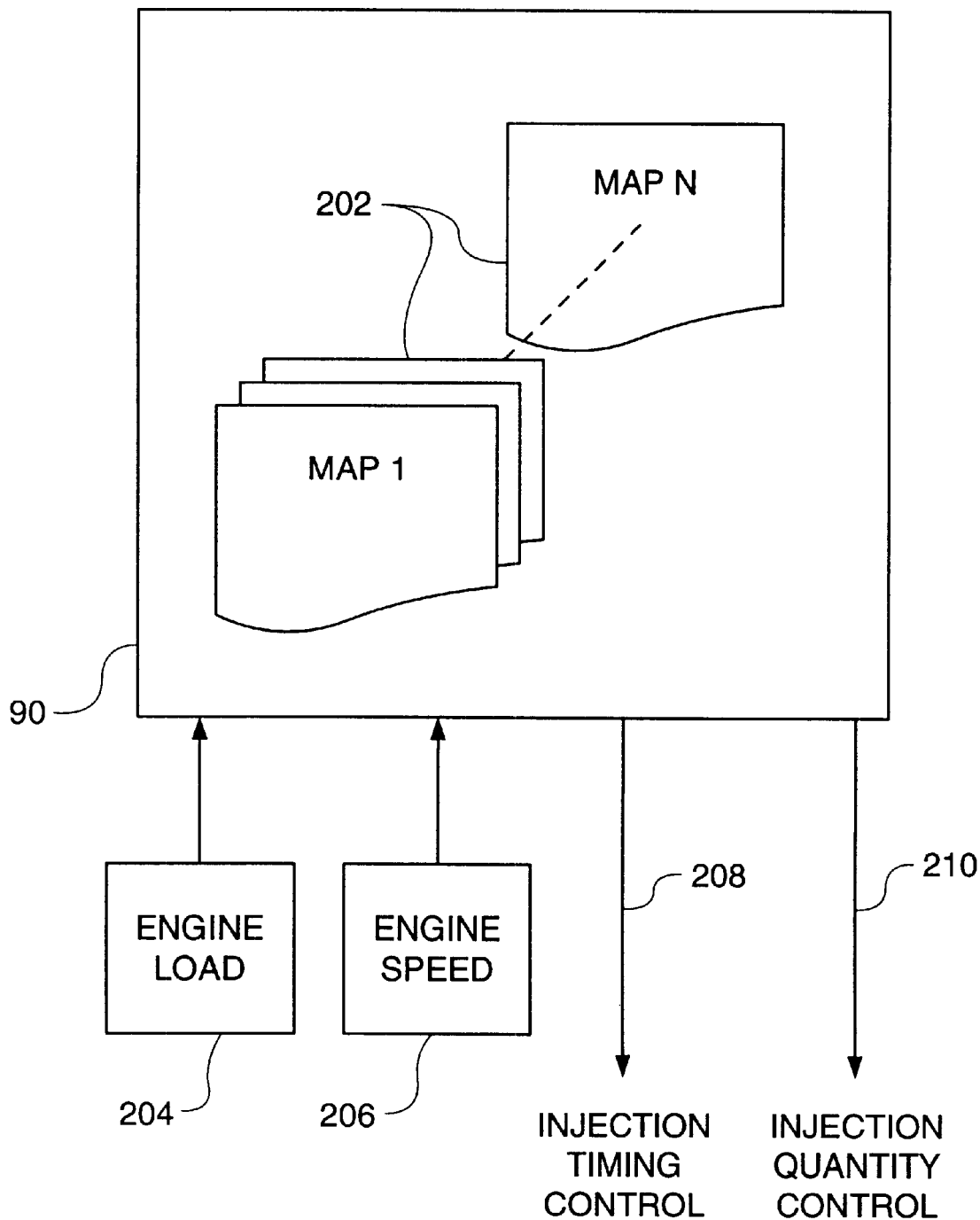
FIG. 2 is a block diagram illustrating a preferred embodiment of the present invention.

The engine assembly 10 further includes a controller 90. The controller 90 is preferably a microprocessor-based engine control unit. As FIG. 2 illustrates, the controller 90 preferably includes a set of maps 202. Each map 202 is a three-dimensional map of fuel injection timing, fuel injection quantity, and $NO_x$ for a determined engine operating load. A change in engine load would result in a new map 202 being referenced. Furthermore, the changes in loads, and hence maps, are based on a determined constant engine speed. A change in engine speed would require reference to additional maps.

The engine speed is determined by an engine speed determining device 206, such as a speed sensor or some such device well known in the art. The engine load is determined by an engine load determining device 204. Examples of engine load determining devices include, but are not limited to, cylinder pressure transducers to measure work per cycle, estimation based on measurement of intake pressure and oxygen in the exhaust, and estimation based on measured fuel mass flow rate.

Figure 3:
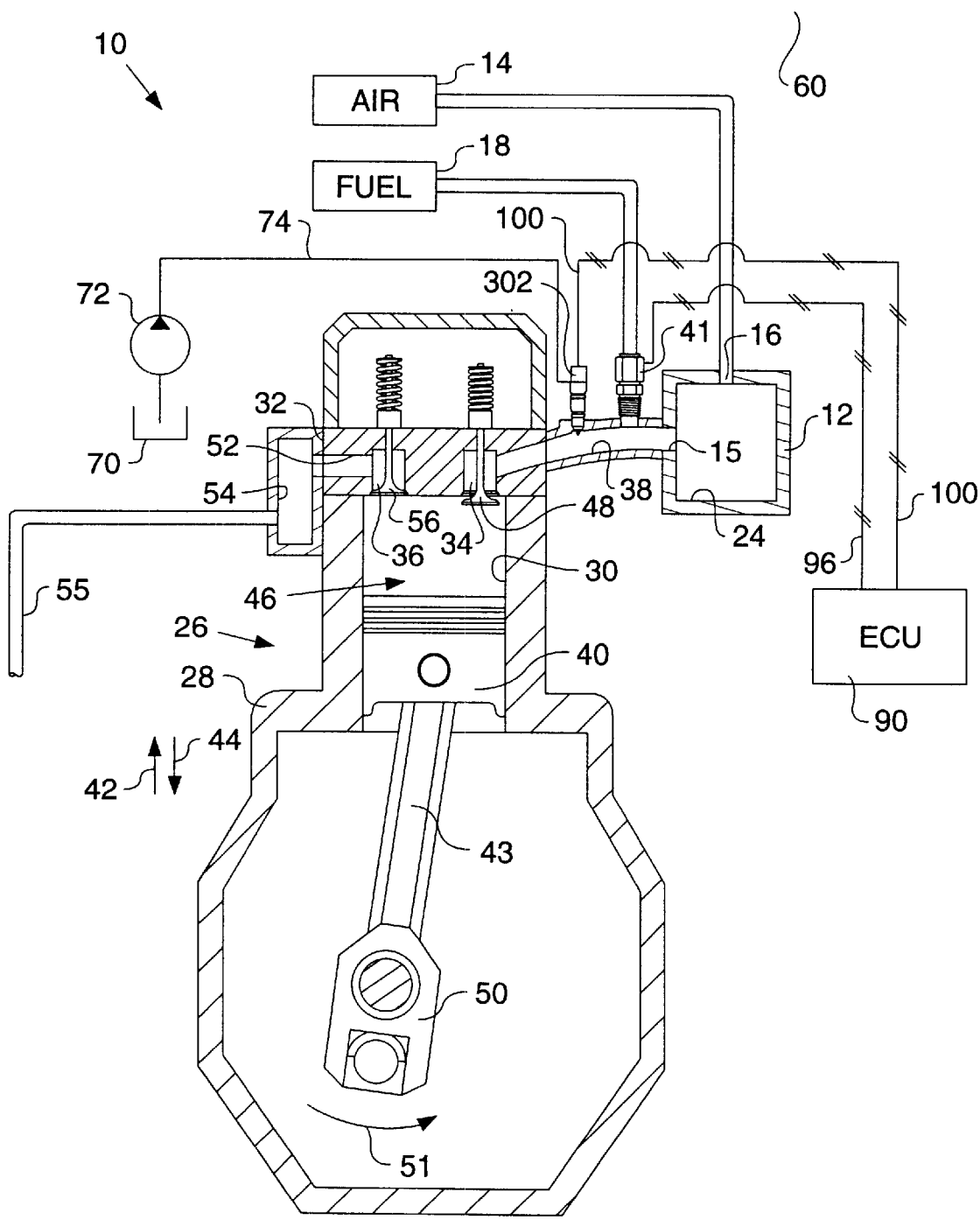
FIG. 3 is a partial cross sectional, partial schematic view of a combustion engine which incorporates features of a preferred embodiment of the present invention.

Referring to FIG. 3, a preferred embodiment of the present invention is shown. The embodiment of FIG. 3 differs from the embodiment of FIG. 1 in that the pilot fuel is introduced into the combustion chamber 46 by way of the intake port 34, rather than by means of direct injection. For example, a port injector 302 may inject pilot fuel into the intake conduit 38, as shown. Alternatively, other devices may be used to deliver the pilot fuel into the intake port 34, such as an acoustic atomizer, an air assisted injector, and the like. Alternatives to the preferred embodiment include introducing the pilot fuel at some other location upstream of the intake conduit 38, for example upstream of the supply of primary fuel and air.

When the pilot fuel is introduced through the intake port 34, the desired timing of pilot fuel injection is no longer an issue. However, the desired amount of pilot fuel to use is still of concern, and is still determined based on engine load, such as determined by use of the maps 202. The maps 202, however, would not include fuel injection timing as a parameter.

INDUSTRIAL APPLICABILITY

In operation, the typical engine assembly 10 operates in a four stroke cycle which includes an intake stroke, a compression stroke, a power stroke, and an exhaust stroke. Although the below discussion pertains specifically to a four stroke engine, the principles of the present invention may apply as well to other types of engines, such as a two stroke engine.

The first stroke is the intake stroke, during which the exhaust valve 56 is positioned in the closed position and the intake valve 48 is positioned in the open position as shown in FIG. 1. During the intake stroke, the piston 40 is advanced downwardly in the general direction of arrow 44 thereby creating a low pressure in the combustion chamber 46. This low pressure draws primary fuel and air from the intake conduit 38 downwardly into the combustion chamber 46 so as to form a homogeneous mixture of air and primary fuel in the combustion chamber 46.

Advancing to the compression stroke, the intake valve 48 and the exhaust valve 56 are both positioned in their respective closed positions. As the piston 40 moves upwardly in the general direction of arrow 42, it compresses primary fuel and air in the combustion chamber 46. At a time during the compression stroke, the fuel injector 62 injects pilot fuel into the combustion chamber 46 so as to ignite the mixture of primary fuel and air. The pilot fuel is injected in advance of 20 degrees before top dead center (BTDC) to allow sufficient time for the pilot fuel to form a homogeneous mixture with the fuel/air mixture already present in the combustion chamber 46.

The controller 90 receives information from the engine load determining device 204 and the engine speed determining device 206 and responsively accesses a relevant map 202. The map 202 provides an indication of a desired injection timing of the pilot fuel and a desired quantity of pilot fuel to be injected based on a desired homogeneous distribution of the pilot fuel and a desired reduced amount of $NO_x$ being exhausted. The controller 90 then delivers command signals via signal lines 208 and 210, which in turn control, respectively, the pilot fuel injection timing and the pilot fuel injection quantity.

Alternatively, the controller 90 may determine the desired pilot fuel injection timing and quantity by methods other than reference to maps. For example, the controller 90 may receive information from a cylinder pressure transducer (not shown) or information relevant to engine speed fluctuations and responsively determine a desired injection quantity based on combustion variability. Furthermore, the controller 90 may receive information relevant to cylinder pressure rise rate, e.g., from measurement of cylinder pressure or the use of a "knock" sensor (not shown), and responsively determine a desired injection timing. The above two alternatives may be used in cooperation with each other to determine both the desired injection timing and the desired injection quantity.

It is noted that the pilot fuel is injected in advance of 20 degrees BTDC. The exact timing, as determined above, is indicative of a reduced amount of $NO_x$ emissions. For example, it is found that $NO_x$ increases as timing is advanced to a point. However, as timing is further advanced, $NO_x$ begins to decrease until the level of $NO_x$ reaches a transition point, i.e., the amount of decrease of $NO_x$ does not change significantly for additional advances in timing. It is desired to control the timing, and also the quantity, of the pilot fuel to attain $NO_x$ emissions at about the transition point. It is found that, with various engines and under various operating conditions, the optimal timing varies anywhere from 20 degrees BTDC to the initiation of the compression stroke, i.e., about 180 degrees BTDC.

In the preferred embodiment of FIG. 3, the pilot injection quantity is desired and the timing of the pilot fuel is not an issue. For example, it may be determined by the above maps or alternative means that the desired injection quantity may be somewhere in the range of 0.5% to 1% of the total fuel introduced into the combustion chamber 46. It is noted, however, that these quantities are exemplary only and may differ in value.

Other aspects can be obtained from a study of the drawings, the disclosure, and the appended claims.

What is claimed is:

1. A method for introducing pilot fuel in a combustion engine, including the steps of:

determining an operating load of the engine;

determining a desired quantity of pilot fuel to be introduced as a function of a desired homogeneous distribution of the pilot fuel based on the engine operating load and as a function of an amount of emission of $NO_x$; and adjusting the quantity of the pilot fuel to the desired values.

2. A method, as set forth in claim 1, wherein determining a pilot fuel quantity includes the step of selecting a desired fuel quantity from a map of pilot fuel quantity and $NO_x$ for the determined engine operating load.

3. A method, as set forth in claim 1, further including the step of determining an operating speed of the engine, the desired homogeneous distribution of the pilot fuel being further based on the engine operating speed.

4. A method for injecting pilot fuel in a combustion engine, including the steps of:
   determining an operating load of the engine;
   determining a desired injection timing of the pilot fuel and a desired quantity of pilot fuel to be injected as a function of a desired homogeneous distribution of the pilot fuel based on the engine operating load and as a function of an amount of emission of $NO_x$; and
   adjusting at least one of the injection timing and quantity of the pilot fuel to the desired values.

5. A method, as set forth in claim 4, wherein determining a desired injection timing includes the step of determining a desired injection timing in advance of 20 degrees before top dead center during a compression stroke.

6. A method, as set forth in claim 4, wherein determining an injection timing and a pilot fuel quantity includes the step of selecting a desired timing and fuel quantity from a map of injection timing, pilot fuel quantity, and $NO_x$ for the determined engine operating load.

7. A method, as set forth in claim 4, further including the step of determining an operating speed of the engine, the desired homogeneous distribution of the pilot fuel being further based on the engine operating speed.

8. A method for providing distributed ignition of a combustion engine, including the steps of:
   introducing a quantity of fuel/air mixture into a combustion chamber of the engine;
   determining an operating load of the engine;
   determining a desired injection timing of a pilot fuel and a desired quantity of the pilot fuel to be injected as a function of a desired homogeneous distribution of the pilot fuel with the fuel/air mixture based on the engine operating load and as a function of a reduced amount of emission of $NO_x$; and
   injecting the desired quantity of pilot fuel at the desired time.

9. A method, as set forth in claim 8, wherein introducing a quantity of fuel/air mixture includes the step of introducing the fuel/air mixture during an intake stroke of the engine.

10. A method, as set forth in claim 9, wherein injecting the desired quantity of pilot fuel includes the step of injecting the pilot fuel during a compression stroke of the engine.

11. A method, as set forth in claim 10, wherein injecting the pilot fuel during a compression stroke includes the step of injecting the pilot fuel in advance of 20 degrees before top dead center.

12. A method, as set forth in claim 8, wherein determining an operating load includes the step of determining an operating load at a constant operating speed of the engine.

13. A method, as set forth in claim 8, wherein determining a desired injection timing and desired quantity as a function of a reduced amount of emission of $NO_x$ includes the step of selecting a desired timing and fuel quantity from a map of injection timing, pilot fuel quantity, and $NO_x$ for the determined engine operating load.

14. An apparatus for providing distributed ignition of a combustion engine, comprising:
   a cylinder assembly which includes (1) an engine block having a piston cylinder defined therein, (2) an engine head secured to the engine block, and (3) a piston which translates within the piston cylinder, wherein the engine block, the engine head, and the piston cooperate to define a combustion chamber;
   an intake port positioned in fluid communication with the combustion chamber during intake of a primary fuel and air mixture;
   a fuel injector positioned in the engine head and operable to inject a pilot fuel into the combustion chamber during a compression stroke of the engine;
   an engine load determining device; and
   a controller which receives information from the engine load determining device and responsively determines a desired injection timing of the pilot fuel and a desired quantity of pilot fuel to be injected based on a desired homogeneous distribution of the pilot fuel within the combustion chamber, and wherein the controller includes a map of injection timing, pilot fuel quantity, and $NO_x$ for the determined engine load.

15. An apparatus, as set forth in claim 14, wherein the engine includes a crankshaft mechanically coupled to the piston, and wherein the controller is operable to cause the fuel injector to inject pilot fuel during the compression stroke in advance of 20 degrees before top dead center.

16. An apparatus, as set forth in claim 14, wherein the engine includes an exhaust port positioned in fluid communication with the combustion chamber during an exhaust stroke of the engine, and wherein the controller is operable to determine the desired injection timing and the desired pilot fuel quantity as a function of an amount of $NO_x$ during exhaust.

17. An apparatus, as set forth in claim 14, wherein the combustion engine is a dual fuel engine.

18. An apparatus, as set forth in claim 17, wherein the primary fuel and air mixture is a mixture of natural gas and air and the pilot fuel is a fuel having a cetane number higher than natural gas.

19. An apparatus, as set forth in claim 14, wherein the combustion engine is a natural gas engine.

20. An apparatus, as set forth in claim 19, wherein the primary fuel and air mixture is a mixture of natural gas and air.

21. An apparatus, as set forth in claim 14, wherein the pilot fuel has a cetane number higher than a cetane number of the primary fuel and air mixture.

22. An apparatus, as set forth in claim 21, wherein the pilot fuel is diesel.

23. An apparatus for providing distributed ignition of a combustion engine, comprising:
   a cylinder assembly which includes (1) an engine block having a piston cylinder defined therein, (2) an engine head secured to the engine block, and (3) a piston which translates within the piston cylinder, wherein the engine block, the engine head, and the piston cooperate to define a combustion chamber;
   an intake port positioned in fluid communication with the combustion chamber during intake of a primary fuel and air mixture;
   a port injector located so as to inject a pilot fuel into the intake port;
   an engine load determining device; and a controller which receives information from the engine load determining device and responsively determines a desired quantity of pilot fuel to be injected based on a desired homogeneous distribution of the pilot fuel within the combustion chamber, wherein the controller includes a map of pilot fuel quantity and $NO_x$ for the determined engine load.

24. An apparatus, as set forth in claim 23, wherein the engine includes an exhaust port positioned in fluid communication with the combustion chamber during an exhaust stroke of the engine, and wherein the controller is operable to determine the desired injection timing and the desired pilot fuel quantity as a function of an amount of $NO_x$ during exhaust.

25. An apparatus, as set forth in claim 23, wherein the primary fuel and air mixture includes a first fuel having a low cetane number and the pilot fuel includes a second fuel having a high cetane number.

26. An apparatus, as set forth in claim 25, wherein the first fuel is natural gas and the second fuel is diesel fuel.

* * * * *